US008700955B2

United States Patent
Moyer et al.

(10) Patent No.: US 8,700,955 B2
(45) Date of Patent: Apr. 15, 2014

(54) MULTI-PROCESSOR DATA PROCESSING SYSTEM HAVING SYNCHRONIZED EXIT FROM DEBUG MODE AND METHOD THEREFOR

(75) Inventors: William C. Moyer, Dripping Springs, TX (US); Jimmy Gumulja, Austin, TX (US); Gary L. Miller, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 251 days.

(21) Appl. No.: 13/239,649

(22) Filed: Sep. 22, 2011

(65) Prior Publication Data

US 2013/0080748 A1    Mar. 28, 2013

(51) Int. Cl.
*G06F 11/00* (2006.01)
(52) U.S. Cl.
USPC .............................. 714/30; 712/227
(58) Field of Classification Search
USPC ................ 714/30, 31, 39, 45; 712/227
See application file for complete search history.

(56) References Cited

U.S. PATENT DOCUMENTS

| 6,321,329 | B1* | 11/2001 | Jaggar et al. ................ 712/227 |
| 6,334,198 | B1* | 12/2001 | Adusumilli et al. .......... 714/727 |
| 6,385,749 | B1* | 5/2002 | Adusumilli et al. .......... 714/733 |
| 6,861,866 | B2 | 3/2005 | Han |
| 6,950,963 | B1 | 9/2005 | Parson et al. |
| 7,010,722 | B2* | 3/2006 | Jahnke ............................ 714/30 |
| 7,636,870 | B2 | 12/2009 | Ueno |
| 7,665,002 | B1 | 2/2010 | White et al. |
| 7,689,815 | B2* | 3/2010 | Moyer et al. .................. 712/227 |
| 2003/0046625 | A1* | 3/2003 | Menon et al. ................. 714/727 |
| 2004/0078656 | A1 | 4/2004 | Ryken |
| 2008/0281547 | A1* | 11/2008 | Nakamura et al. ............ 702/120 |
| 2009/0235059 | A1* | 9/2009 | Moyer et al. .................. 712/227 |
| 2009/0259889 | A1* | 10/2009 | Luo ................................ 714/31 |
| 2010/0174958 | A1* | 7/2010 | Maeda et al. ................. 714/727 |
| 2010/0262811 | A1 | 10/2010 | Moyer et al. |

OTHER PUBLICATIONS

Amontec, Inc.; "JTAG Interface: Simple Introduction;" http://www.amontec.com/pub/amt_ann004.pdf; Nov. 16, 2005; retrieved from the Internet on Jul. 22, 2013.*

* cited by examiner

*Primary Examiner* — Scott Baderman
*Assistant Examiner* — Joseph Kudirka
(74) *Attorney, Agent, or Firm* — Daniel D. Hill (57) ABSTRACT

A data processing system includes a plurality of data processors, debug logic, and linking logic. The debug logic is coupled to each data processor of the plurality of data processors, and is for providing an instruction for exiting debug mode to the plurality of data processors. The linking logic is coupled to the debug logic and to each of the plurality of data processors. The linking logic is for linking selected ones of the plurality of data processors with each other and to the debug logic. The debug logic provides the instruction for exiting the debug mode when the selected ones of the plurality of data processors are linked in parallel by the linking logic.

18 Claims, 4 Drawing Sheets

MULTI-PROCESSOR DATA PROCESSING SYSTEM HAVING SYNCHRONIZED EXIT FROM DEBUG MODE AND METHOD THEREFOR

BACKGROUND

1. Field

This disclosure relates generally to integrated circuits, and more specifically, to a multi-processor system-on-a-chip (SoC) data processing system having synchronized exit from debug mode and method therefor.

2. Related Art

A system-on-a-chip can include a number of processors and other master and peripheral cores. When debugging the system, individual units, such as the processor cores and peripheral units may enter a debug halted mode due to either a system event, or by command of an external hardware debugging tool. The individual units may enter debug mode at varying times and due to differing events.

Debugging may be performed in accordance with various procedures and interface architectures. One common interface architecture and protocol is defined by IEEE standard 1149.1, also known and JTAG. The JTAG standard is suitable for single core integrated circuits and multiple core integrated circuits. In a multiple core integrated circuit, each core is provided with a TAP (test access port) controller. A test path, or scan chain, is formed through the TAP circuits of each of the cores. The length of the test path is determined by the number of serially-interconnected cores or other units. A top-level TAP controller is used to control the interconnection of cores and other units for debugging operations by interconnecting, or "linking" one or more individual TAP controllers in a serial fashion.

Once an entry into debug mode occurs for one or more units, the external hardware debugging tool may perform serial scan or other operations to query the state of the units, either individually, or in groups. These accesses are performed using a JTAG scan sequence to access the individual JTAG TAP controllers within the individual units. The hardware debugging tool utilizes the top-level TAP controller to select individual unit TAP controllers for access. Accesses to units may be individual accesses, in which only a single unit TAP controller is connected, or may be done with a common group of accesses by concatenating multiple unit TAP controllers to a single long instruction register (IR) and data register (DR).

During the debugging session, individual cores or units that are in debug mode may be queried and controlled by the hardware debugger. When debugging is completed, the hardware debugging tool releases, or reactivates, the units which are currently in debug mode to resume active processing. The external debugging tool may release only one unit, a subset of units, or all of the units. It may be necessary to reactivate the units in a synchronized manner in order to provide a known boundary for re-activation. Reactivation controls can vary, depending on the type of unit. For some units, a JTAG debug "GO" IR command is used, in which the JTAG interface of the unit receives a JTAG IR instruction to cause the unit to exit debug mode. Other units on the SoC may provide a hardware signal that is driven by logic within the SoC to cause exit from debug mode.

For reactivation of the units, the JTAG TAP controllers of the halted units are reconfigured into a single long serial scan chain of TDI and TDO signals via a TAP linking module. The TAP linking module effectively concatenates the selected individual scan chains. Then the hardware debugging tool determines the individual instructions required for each of the various devices and their order in the scan chain. Because each individual unit could have a unique instruction, instruction length, or other sequence for exiting debug mode, the debugging tool has a complex task for forming a single potentially very long pseudo-instruction to control all of the currently halted units. In addition, the linking control information used by the TAP linking logic is also complicated because any possible combination of units must be supported.

Therefore, what is needed is a simpler system and method for synchronously exiting debug mode in a multi-processor SoC.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, an embodiment of a method and system for simplifying exit from debug mode in a SoC having multiple processors. In an embodiment, a GO+EXIT TAP instruction is provided which when executed by TAP control and processor core debug control logic, causes the core or other type of unit to exit a debug halted mode and resume normal operation. The embodiment comprises a modification of the GO+EXIT TAP instruction. The modification causes the execution of the GO+EXIT TAP instruction by a processor core to be conditionally treated as a no operation (NOP) instruction based on the current state of the processor core. The top-level TAP controller includes instruction broadcast logic to allow the top-level TAP controller to broadcast the GO+EXIT TAP instruction to all of the processors in parallel to cause the processors to exit debug mode synchronously. Processors that are not currently halted in a debug mode respond to the GO+EXIT TAP instruction by executing it as a NOP instruction. Also, when the GO+EXIT TAP instruction is executed, each processor of the system asserts a debug exit output signal. The debug exit signal is asserted as an indicator that the processor is no longer in debug mode, even if the GO+EXIT TAP instruction is treated as a NOP. The debug exit signal allows the hardware debugging tool freedom to ignore the current debug halted state of the processor. In addition, the debug exit signals that are asserted in response to the GO+EXIT instruction are used to generate a hardware exit debug signal that is sent to system modules that do not have individual TAP controllers, or have an alternate method for exiting debug mode.

The modified operation of the GO+EXIT TAP instruction simplifies exit from debug mode in a SoC data processing system having multiple processors. Synchronous exit of debug mode is performed by placing all of the individual TAP controllers in parallel, scanning in a single GO+EXIT instruction, and each of the individual processors executing the GO+EXIT instruction. All of the processors will then assert a debug exit signal and those processors that are currently in debug mode will exit debug mode and begin normal instruction execution. All processors that are not currently in debug mode respond to the GO+EXIT TAP instruction by executing it as a NOP instruction. Additional logic will receive the debug exit signals and generate an exit debug signal to all of the modules that lack individual TAP controllers. The system will therefore exit debug mode synchronously.

In one aspect, there is provided, a data processing system including: a plurality of data processors; debug logic coupled to each data processor of the plurality of data processors, the debug logic for providing an instruction for exiting debug mode to the plurality of data processors; and linking logic, coupled to the debug logic and to each of the plurality of data processors, the linking logic for linking selected ones of the plurality of data processors with each other and to the debug logic, wherein the debug logic provides the instruction for exiting the debug mode when the selected ones of the plurality of data processors are linked in parallel by the linking logic. The data processing system may further include combinational logic having a plurality of inputs and an output, wherein the plurality of data processors each provide an exit debug signal to a selected input of the plurality of inputs, and in response, the combinational logic providing a hardware exit debug signal at the output. The data processing system may further include a plurality of modules, each of the plurality of modules having an input for receiving the hardware exit debug signal. Each of the plurality of data processors comprises an individual test access port (TAP) controller in accordance with IEEE standard 1149.1 (JTAG). The debug logic may include a top-level test access port (TAP) controller, and wherein the individual TAP controllers of the selected ones of the plurality of data processors are linked in parallel with each other and to the top-level TAP controller. Each of the plurality of data processors may include an output terminal for providing an exit debug signal in response to receiving the instruction for exiting the debug mode. Each of the plurality of data processors may provide the exit debug signal in response to receiving the instruction for exiting the debug mode whether or not each of the plurality of data processors are in debug mode. Each of the plurality of data processors that are not in debug mode may treat the instruction for exiting the debug mode as a no operation (NOP) instruction. The data processing system may further include a logic gate having a plurality of input terminals for receiving the exit debug signals from the plurality of data processors, the logic gate having an output terminal for providing a hardware exit debug signal to a plurality of modules.

In another aspect, there is provided, a method for exiting debug mode in a data processing system having a plurality of data processors, the method including: providing an exit debug instruction to each processor of the plurality of data processors; determining that a first processor of the plurality of data processors is in a debug mode; causing the first processor to exit debug mode and begin normal instruction execution; determining that a second processor of the plurality of data processors is not in the debug mode; causing the second processor to treat the exit debug instruction as a no operation (NOP) instruction; and causing each processor of the plurality of processors to provide an exit debug signal. The step of providing an exit debug instruction to each processor of the plurality of processors may further include providing the exit debug instruction to the plurality of processors in parallel. The method may further include providing a hardware exit debug signal to a plurality of modules in response to the exit debug signal provided by each of the plurality of processors. The method may further include linking an individual test access port (TAP) of each processor of the plurality of processors in parallel with each other and to a top-level TAP controller of the data processing system prior to providing the exit debug instruction to each processor of the plurality of data processors. The method may further include: providing the exit debug signal from each processor of the plurality of processors to a corresponding input of a logic gate having a plurality of inputs; and providing a hardware exit debug signal from an output of the logic gate to each module of a plurality of modules. The step of providing an exit debug instruction to each processor of the plurality of data processors may further include scanning the exit debug instruction to the plurality of processors as a JTAG command.

In yet another aspect, there is provided, a method for exiting debug mode in a data processing system having a plurality of processors, the method including: linking a test access port (TAP) of each processor of the plurality of processors in parallel with each other and to a top-level TAP controller of the data processing system; and providing an exit debug instruction to each processor of the plurality of processors via the TAP of each processor. The method may further include: determining that a first processor of the plurality of data processors is in a debug mode; and causing the first processor to exit debug mode and begin normal instruction execution. The method may further include: determining that a second processor of the plurality of data processors is not in the debug mode; and causing the second processor to treat the exit debug instruction as a no operation (NOP) instruction. The method may further include: each processor of the plurality of processors generating an exit debug signal in response to receiving the exit debug instruction; providing the exit debug signal from each processor of the plurality of processors to a corresponding input of a logic gate having a plurality of inputs; and providing a hardware exit debug signal from an output of the logic gate to each module of a plurality of modules. The method may further include providing a hardware exit debug signal from each processor of the plurality of processors to cause a plurality of modules to exit the debug mode.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 1:
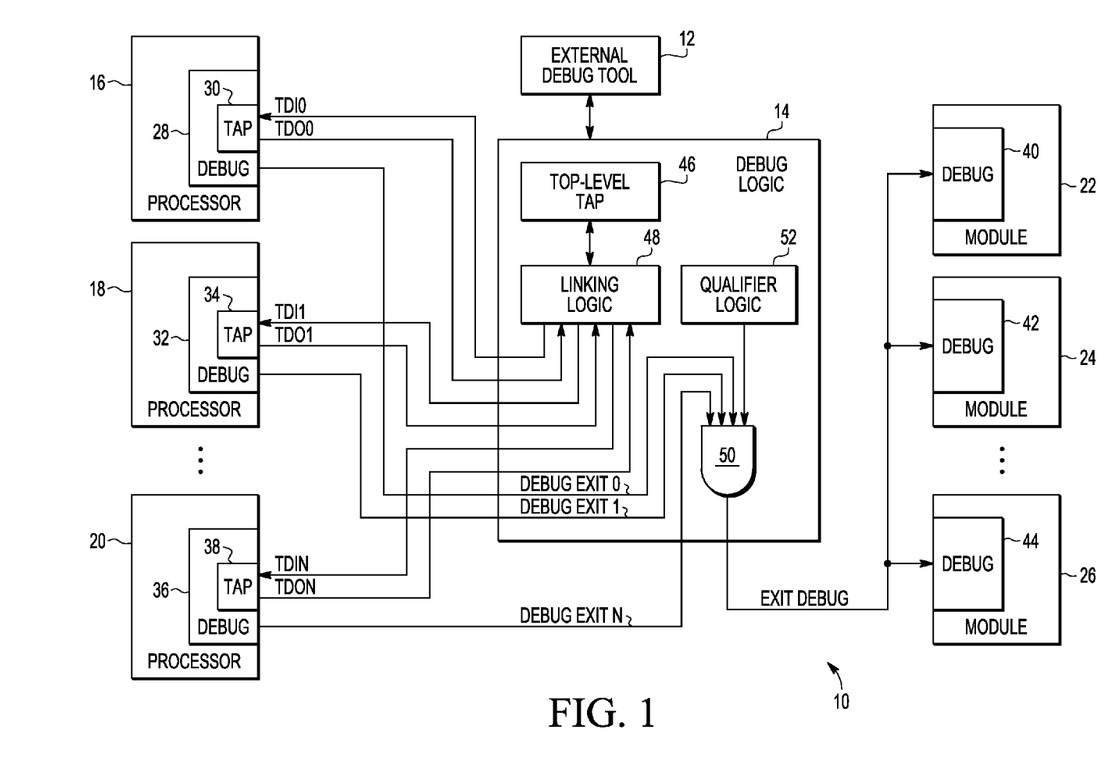
FIG. 1 illustrates, in block diagram form, a debug system of an SOC data processing system in accordance with an embodiment.

FIG. 1 illustrates, in block diagram form, a SoC data processing system 10 and external debug tool 12 in accordance with an embodiment. Note that the FIG. 1 illustration of data processing system 10 has been greatly simplified for the purpose of clarity. System 10 includes debug logic 14, a plurality of processors including processors 16, 18, and 20, and a plurality of modules including modules 22, 24, and 26. Each processor of the plurality of processors includes debug circuits and individual TAP controllers. For example, processor 16 includes debug circuit 28 and TAP controller 30, processor 18 includes debug circuit 32 and TAP controller 34, and processor 20 includes debug circuit 36 and TAP controller 38. Each module of the plurality of modules includes a debug circuit. For example, module 22 includes debug circuit 40, module 24 includes debug circuit 42, and module 26 includes debug circuit 44. Generally, a module differs from a processor in that the module lacks an individual TAP controller for executing JTAG instructions. There can be any number of processors and modules.

The TAP controllers 30, 34, and 38 of data processors 16, 18, and 20, respectively, are compliant with IEEE standard 1149.1, also known and JTAG, as applied to a multiple core data processing system. Therefore, each TAP controller 30, 34, and 38 typically includes certain hardware defined by the standard, such as for example, a boundary scan register, an instruction register (IR), a data register (DR), and JTAG defined signals such as a clock signal TCK, a test data input signal TDI, a test data output signal TDO, and a test mode select signal TMS. However, in the illustrated embodiment, only those signals and circuit elements necessary to describe the disclosed embodiment are shown.

Debug logic 14 includes top-level TAP controller 46, linking logic 48, qualifier logic 52, and logic gate 50. In FIG. 1, debug logic 14 has a plurality of bi-directional terminals connected to a plurality of bi-directional terminals of external debug tool 12. External debug tool 12 controls debugging operations of data processing system 10. Top-level TAP controller 46 has a plurality of bi-directional terminals connected to a plurality of bi-directional terminals of TAP linking logic 48. TAP linking logic 48 has a plurality of test data input (TDI) terminals and a plurality of test data output (TDO) terminals for linking with the TDI and TDO terminals of each of processors 16, 18, and 20. Linking logic 48 includes switches for connecting together the TDI and TDO terminals in any combination as determined by top-level TAP controller 46 based on requests by debug tool 12. Also, the debug circuit of each processor has an output terminal for providing a hardware debug exit signal. For example, debug circuit 28 of processor 16 has an output terminal for providing hardware debug exit signal DEBUG EXIT 0, debug circuit 32 of processor 18 provides hardware debug exit signal DEBUG EXIT 1, and debug circuit 36 of processor 20 provides hardware debug exit signal DEBUG EXIT N.

In multiple core data processing system 10, each processor is provided with a TAP (test access port) controller. Top-level TAP controller 46 is used to control debugging operations. In accordance with the JTAG standard, a test path, or scan chain, may be formed through each of the cores using the TAP controllers of each processor and TAP linking logic 48. The length of the scan chain is determined by the number of processors included in the scan chain. In the illustrated embodiment, the instruction for exiting debug mode includes a combination of a GO command bit and an EXIT (EX) command bit of a debug command register included within debug circuits 32, 28, and 36 to form the GO+EXIT instruction. In accordance with one exemplary set of debug command register bit definitions, if the GO command bit is a zero (0) or logic low, the GO command is inactive and no action is taken. If the GO command bit is a one (1) or logic high, the instruction currently in the IR is executed. To execute the instruction in the IR, the processor leaves debug mode, executes the instruction, and if the EX bit is cleared, returns to debug mode immediately after executing the instruction. If the EX bit is set, the processor does not return to debug mode and proceeds to normal operation.

In accordance with the illustrated embodiment, the GO+EXIT instruction is broadcast to selected ones of processors 16, 18, and 20 when using top-level TAP controller 46 and linking logic 48. Top-level TAP controller 46 may send the exit debug exit instruction (GO+EXIT) to selected processors or to all of the processors in system 10. Some of the processors that receive the GO+EXIT instruction may be in debug mode and some may not be in debug mode. In response to receiving the GO+EXIT instruction each processor provides a debug exit signal. For example, processor 16 provides debug exit signal DEBUG EXIT 0. Each processor provides the debug exit signal whether or not the processor is in debug mode. If a processor that receives the GO+EXIT instruction is not in debug mode, the instruction is treated by the processor as a no operation (NOP) instruction, but the debug exit signal is still provided. The provision of the debug exit signal, such as for example signal DEBUG EXIT 0, allows the external debug tool 12 freedom to ignore the current debug state of a processor when directing that a GO+EXIT command should be executed, because it can rely on the fact that the debug exit signal will always be generated. Because this capability is provided in the illustrated embodiment, external debug tool 12 may direct top-level TAP controller to link all processors in parallel for receiving the GO+EXIT command, rather than requiring a serial linking of only selected processor that are currently in debug mode, and avoiding sending a GO+EXIT instruction to processors which are not currently in debug mode.

In addition to indicating that the processors are out of debug mode, the debug exit signals of each of the processors are provided to an input terminal of AND logic gate 50. In response to receiving the debug exit signals from the processors, logic gate 50 provides a hardware exit debug signal EXIT DEBUG to each module debug circuit of the modules of system 10, such as for example, debug circuits 40, 42, and 44 of modules 22, 24, and 26, respectively. Modules receive the hardware exit debug signal if the module does not have a TAP controller or otherwise cannot process an exit instruction. In the illustrated embodiment, logic gate 50 is an AND logic gate. In another embodiment, the logic type of logic gate 50 may be different. For example, an OR logic gate may used in an embodiment where not all of the processors operate at the same clock rate, because not all of signals are guaranteed to be asserted simultaneously. Also, if necessary, an additional input terminal of AND logic gate 50 may be used by particular qualifier logic such as qualifier logic 52. In one embodiment, qualifier logic 52 may be a control bit that determines whether or not modules 22, 24, or 26 are to execute a particular instruction, or otherwise respond to the hardware EXIT DEBUG signal. Also, in an embodiment, logic gate 50 may be replaced with combinational logic that generates the EXIT DEBUG signal based on a selected subset of debug exit signals from debug logic 28, 32, and 36. The selected subset may be predetermined, or may be under the control of external hardware debug tool 12 via controls provided to hardware debug tool 12 by debug logic 14.

Figure 2:
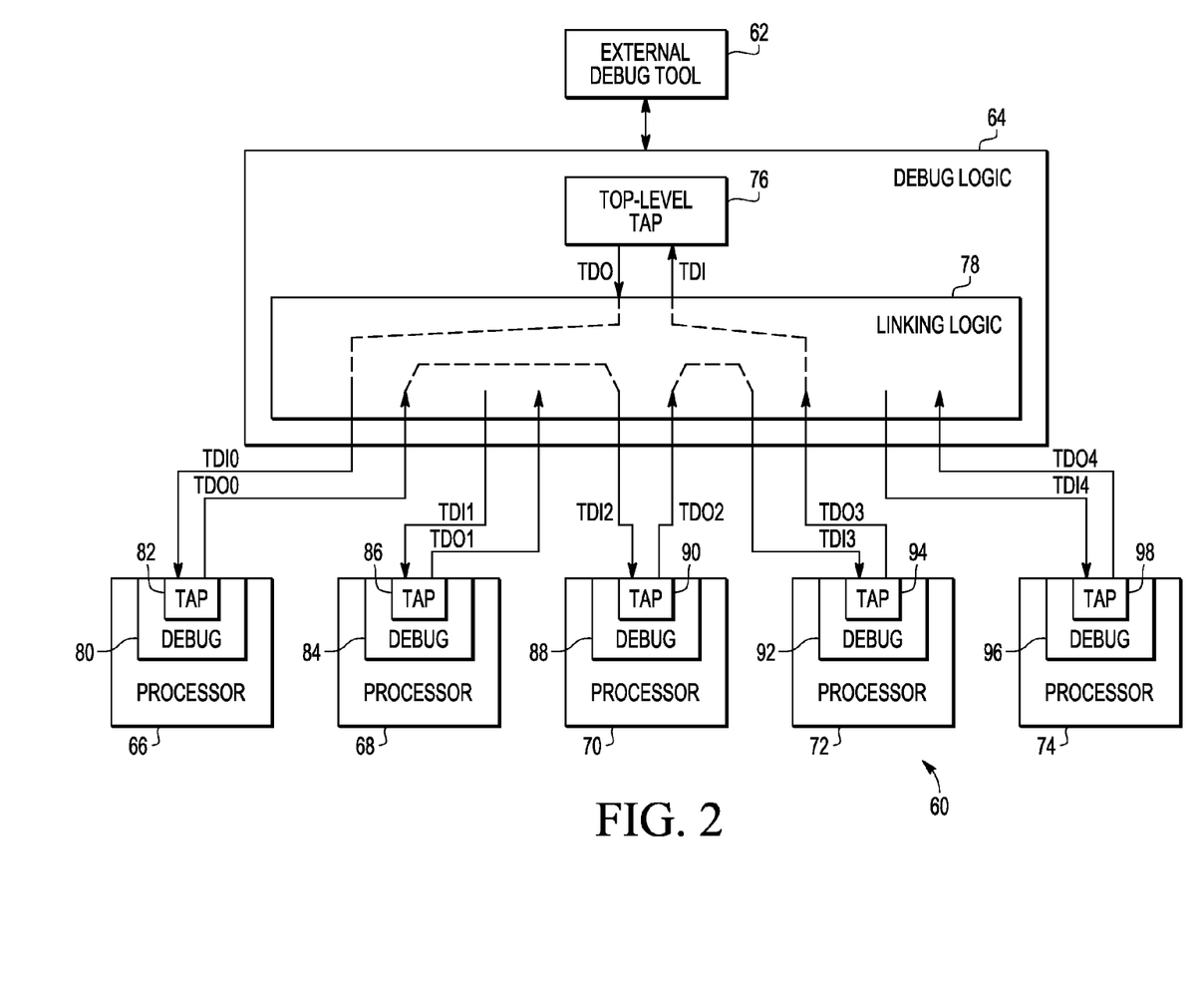
FIG. 2 illustrates, in block diagram form, a data processing system in accordance with one example of exiting debug mode.

FIG. 2 illustrates, in block diagram form, data processing system 60 in accordance with one specific example of exiting debug mode. Data processing system 60 is connected to an external debug tool 62. Data processing system 60 includes a plurality of processors 66, 68, 70, 72, and 74 and debug logic 64. Processor 66 includes debug circuit 80 and individual TAP controller 82, processor 68 includes debug circuit 84 and TAP controller 86, processor 70 includes debug circuit 88 and TAP controller 90, processor 72 includes debug circuit 92 and TAP controller 94, and processor 74 includes debug circuit 96 and TAP controller 98. Debug logic 64 includes top-level TAP controller 76 and linking logic 78.

In FIG. 2, top-level TAP controller 76 is coupled to processors 66, 70, and 72 using linking logic 78. A scan chain is formed using linking logic 78. The scan chain connections are illustrated by the dashed lines. In the specific example of FIG. 2, a scan chain is formed using three of the five processors. As illustrated, the TDO terminal of top-level TAP controller 76 is connected to TDI 0 terminal of individual TAP controller 82 (processor 66). Within TAP controller 82, the TDI 0 and TDO 0 terminals are used to receive/send serial data. The TDO 0 terminal of TAP controller 82 is connected to the TDI 2 terminal of TAP controller 90 (processor 70) via linking logic 78. The TDO 2 terminal of TAP controller 90 is connected to the TDI 3 terminal of TAP controller 94 (processor 72) via linking logic 78. The TDO 3 terminal of TAP controller 94 is connected to the TDI terminal of top-level TAP controller 76 via linking logic 78.

Debug instructions are provided to the processors via the scan chain by concatenating the individual debug instructions for these selected processors into a single long complex debug "pseudo-instruction". Because the specific serial interconnection configuration of the processors at any given time can vary, the number of different combinations of complex debug pseudo-instructions is large, and can overly complicate the task of external debug tool 12 to compose them properly, based on the particular serial linking configuration which is currently in place. The above described exit instruction GO+EXIT can also be provided to the processors via the scan chain in another embodiment.

Figure 3:
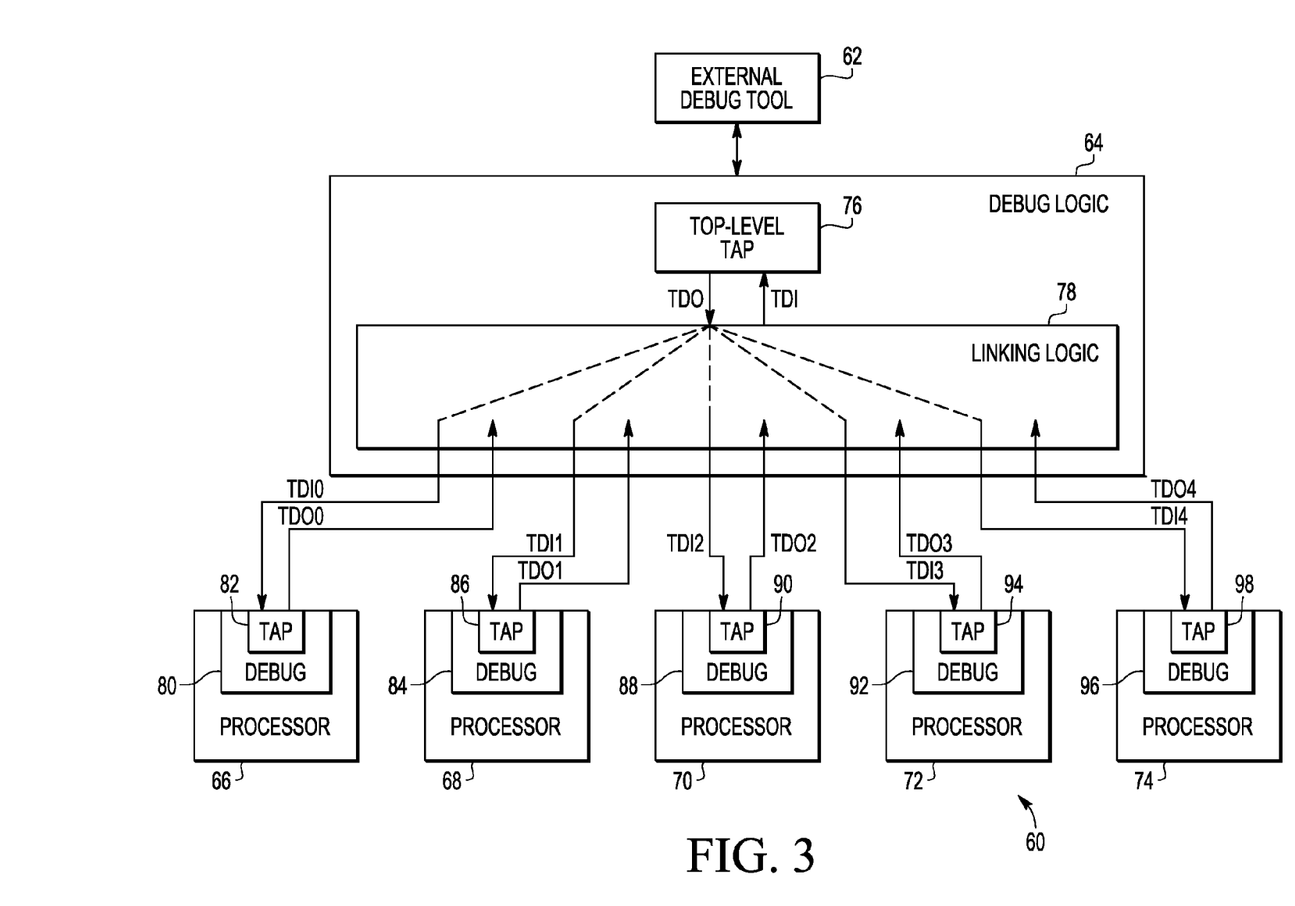
FIG. 3 illustrates, in block diagram form, a data processing system in accordance with another example of exiting debug mode.

FIG. 3 illustrates, in block diagram form, data processing system 60 with all of the TDI terminals of the processors 66, 68, 70, 72, and 74 connected in parallel via linking logic 78 and to top-level TAP controller 76 for receiving the GO+EXIT TAP instruction as described above. Specifically, linking logic 78 couples the TDO terminal of top-level TAP controller 76 to terminals TDI 0, TDI 1, TDI 2, TDI 3, and TDI 4. In another embodiment, a subset of the TDI terminals can be connected to the TDO terminal of top-level TAP controller 76. By connecting the TDI terminals in parallel, the processors will receive a debug instruction in parallel that may be used to cause the processors to exit debug mode synchronously. Also, a single potentially very long concatenated pseudo-instruction to control all of the currently halted units is not needed. Instead, a single simple instruction is scanned in parallel to all processors to cause synchronous debug exit regardless of their current operating mode (debug mode or normal mode).

Figure 4:
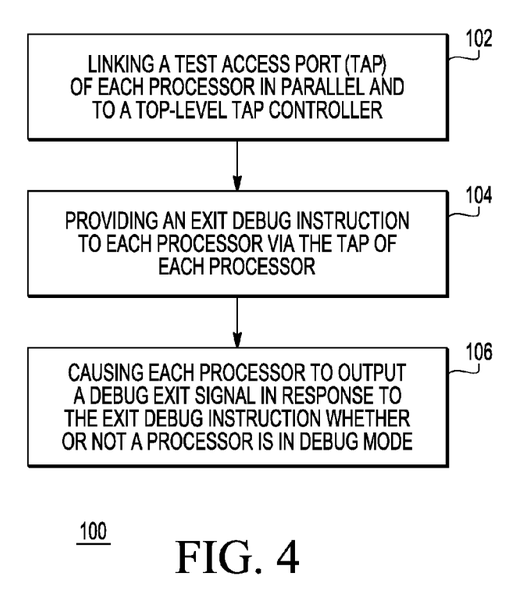
FIG. 4 illustrates a flowchart of a method for exiting debug in a multi-processor data processing system in accordance with an embodiment.

FIG. 4 illustrates a flowchart of a method 100 for exiting debug in a multi-processor data processing system in accordance with an embodiment. At step 102, A TAP controller of each processor is linked together in parallel in with each other and to a top-level TAP controller. As discussed above, FIG. 3 discloses an embodiment for connecting a plurality of individual TAP controllers in parallel. At step 104, an exit debug instruction is provided to each processor via the TAP controller of each processor. If the processor is not in debug mode, the processor treats the exit debug instruction as a NOP. At step 106, each processor of the data processing system is caused to output a debug exit signal in response to the exit debug instruction. The debug exit signal is sent by the processor whether or not the processor was in debug mode.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
   a plurality of data processors;
   debug logic coupled to each data processor of the plurality of data processors, the debug logic for providing an instruction for exiting debug mode to the plurality of data processors; and
   linking logic, coupled to the debug logic and to each of the plurality of data processors, the linking logic for linking selected ones of the plurality of data processors with each other and to the debug logic, wherein the debug logic provides the instruction for exiting the debug mode when the selected ones of the plurality of data processors are linked in parallel by the linking logic, and
   wherein each of the plurality of data processors comprises an output terminal for providing an exit debug signal in response to receiving the instruction for exiting the debug mode.

2. The data processing system of claim 1, wherein each of the plurality of data processors comprises an individual test access port (TAP) controller in accordance with IEEE (Institute of Electrical and Electronics Engineers) standard 1149.1 (JTAG (Joint Test Action Group)).

3. The data processing system of claim 2, wherein the debug logic comprises a top-level test access port (TAP) controller, and wherein the individual TAP controllers of the selected ones of the plurality of data processors are linked in parallel with each other and to the top-level TAP controller.

4. The data processing system of claim 1, wherein each of the plurality of data processors provides the exit debug signal in response to receiving the instruction for exiting the debug mode regardless of whether or not each of the plurality of data processors is in debug mode.

5. The data processing system of claim 1, wherein each of the plurality of data processors that are not in debug mode treat the instruction for exiting the debug mode as a no operation (NOP) instruction.

6. The data processing system of claim 1, further comprising a logic gate having a plurality of input terminals for receiving the exit debug signals from the plurality of data processors, the logic gate having an output terminal for providing a hardware exit debug signal to a plurality of modules.

7. A data processing system comprising:
   a plurality of data processors;
   debug logic coupled to each data processor of the plurality of data processors, the debug logic for providing an instruction for exiting debug mode to the plurality of data processors;
   linking logic, coupled to the debug logic and to each of the plurality of data processors, the linking logic for linking selected ones of the plurality of data processors with each other and to the debug logic, wherein the debug logic provides the instruction for exiting the debug mode when the selected ones of the plurality of data processors are linked in parallel by the linking logic; and
   combinational logic having a plurality of inputs and an output, wherein the plurality of data processors each provide an exit debug signal to a selected input of the plurality of inputs, and in response, the combinational logic providing a hardware exit debug signal at the output.

8. The data processing system of claim 7, further comprising a plurality of modules, each of the plurality of modules having an input for receiving the hardware exit debug signal.

9. A method for exiting debug mode in a data processing system having a plurality of data processors, the method comprising:
   providing an exit debug instruction to each processor of the plurality of data processors;
   determining that a first processor of the plurality of data processors is in a debug mode;
   causing the first processor to exit debug mode and begin normal instruction execution;
   determining that a second processor of the plurality of data processors is not in the debug mode;
   causing the second processor to treat the exit debug instruction as a no operation (NOP) instruction; and
   causing each processor of the plurality of processors to provide an exit debug signal.

10. The method of claim 9, wherein providing an exit debug instruction to each processor of the plurality of processors further comprises providing the exit debug instruction to the plurality of processors in parallel.

11. The method of claim 9, further comprising providing a hardware exit debug signal to a plurality of modules in response to the exit debug signal provided by each of the plurality of processors.

12. The method of claim 9, further comprising linking an individual test access port (TAP) of each processor of the plurality of processors in parallel with each other and to a top-level TAP controller of the data processing system prior to providing the exit debug instruction to each processor of the plurality of data processors.

13. The method of claim 9, further comprising:
   providing the exit debug signal from each processor of the plurality of processors to a corresponding input of combinational logic having a plurality of inputs; and
   providing a hardware exit debug signal from an output of the combinational logic to each module of a plurality of modules.

14. The method of claim 9, wherein providing an exit debug instruction to each processor of the plurality of data processors further comprises scanning the exit debug instruction to the plurality of processors as a JTAG (Joint Test Action Group) command.

15. A method for exiting debug mode in a data processing system having a plurality of processors, the method comprising:
- linking a test access port (TAP) of each processor of the plurality of processors in parallel with each other and to a top-level TAP controller of the data processing system;
- providing an exit debug instruction to each processor of the plurality of processors via the TAP of each processor; and
- providing a hardware exit debug signal from each processor of the plurality of processors to cause a plurality of modules to exit the debug mode.

16. The method of claim 15, further comprising:
- determining that a first processor of the plurality of data processors is in a debug mode; and
- causing the first processor to exit debug mode and begin normal instruction execution.

17. A method for exiting debug mode in a data processing system having a plurality of processors, the method comprising:
- linking a test access port (TAP) of each processor of the plurality of processors in parallel with each other and to a top-level TAP controller of the data processing system;
- providing an exit debug instruction to each processor of the plurality of processors via the TAP of each processor;
- determining that a second processor of the plurality of data processors is not in the debug mode; and
- causing the second processor to treat the exit debug instruction as a no operation (NOP) instruction.

18. The method of claim 17 further comprising:
- each processor of the plurality of processors generating an exit debug signal in response to receiving the exit debug instruction;
- providing the exit debug signal from each processor of the plurality of processors to a corresponding input of combinational logic having a plurality of inputs; and
- providing a hardware exit debug signal from an output of the combinational logic to each module of a plurality of modules.

* * * * *